US012592035B2

(12) United States Patent
Kulkarni et al.

(10) Patent No.: US 12,592,035 B2
(45) Date of Patent: Mar. 31, 2026

(54) FUSED BOUNDING VOLUME HIERARCHY FOR MULTIPLE LEVELS OF DETAIL

(71) Applicants:Advanced Micro Devices, Inc, Santa Clara, CA (US); ATI Technologies ULC, Markham (CA)

(72) Inventors: Paritosh Vijay Kulkarni, Markham (CA); Ikeda Sho, Yokohama (JP); Takahiro Harada, Roseville, CA (US)

(73) Assignees: Advanced Micro Devices, Inc, Santa Clara, CA (US); ATI Technologies ULC, Markham (CA)

( * ) Notice: Subject to any disclaimer, the term of this patent is extended or adjusted under 35 U.S.C. 154(b) by 258 days.

(21) Appl. No.: 18/375,046

(22) Filed: Sep. 29, 2023

(65) Prior Publication Data

US 2025/0111606 A1      Apr. 3, 2025

(51) Int. Cl.
*G06T 17/00*        (2006.01)
*G06T 17/20*        (2006.01)

(52) U.S. Cl.
CPC ............ *G06T 17/005* (2013.01); *G06T 17/20* (2013.01)

(58) Field of Classification Search
None
See application file for complete search history.

(56) References Cited

U.S. PATENT DOCUMENTS 11,158,112 B1 * 10/2021 Yeo .......................... G06T 15/06
2009/0189898 A1 * 7/2009 Dammertz .............. G06T 15/55
                                                        345/426

2014/0362074 A1 * 12/2014 Karras .................... G06T 15/06
                                                        345/419
2015/0279092 A1 * 10/2015 Ganestam ............. G06T 17/005
                                                        345/419
2017/0091992 A1 * 3/2017 Rogers .................... G06T 17/20
2019/0035139 A1 * 1/2019 Zimmerman ........... G06T 15/06

(Continued)

OTHER PUBLICATIONS

Akenine-Moller, Tomas , et al., "Real-Time Rendering", A K Peters/CRC Press, New York [retrieved Dec. 14, 2022]. Retrieved from the Internet <https://www.taylorfrancis.com/books/mono/10.1201/9781315365459/real-time-rendering-tomas-akenine-mo%CC%88ller-eric-haines-naty-hoffman>., Jan. 30, 2019, 111 Pages.

(Continued)

*Primary Examiner* — Sultana M Zalalee
(74) *Attorney, Agent, or Firm* — FIG. 1 Patents

(57)          ABSTRACT

A fused bounding volume hierarchy, which is a combination of a base bounding volume hierarchy and one or more non-base bounding volume hierarchies, is generated. For each non-base bounding volume hierarchy, multiple subtrees in the non-base bounding volume hierarchy that include less than a threshold number of child nodes are identified. Each of these subtrees is then fused with the base bounding volume hierarchy at one of the nodes of the base bounding volume hierarchy, and an identifier of the level of detail for the non-base bounding volume hierarchy is included in the node. When displaying a scene or image, for a particular portion of the scene or image the level of detail to use is identified. The fused bounding volume hierarchy is traversed and the geometric objects in the nodes of the fused bounding volume hierarchy corresponding to the identified level of detail are displayed.

20 Claims, 10 Drawing Sheets

(56)     References Cited

U.S. PATENT DOCUMENTS

2020/0320776 A1 * 10/2020 Doyle ........................ G06T 9/00
2023/0298254 A1 * 9/2023 Benthin .................. G06T 15/06
                                                        345/418

OTHER PUBLICATIONS

Bittner, Jiří, et al., "Fast Insertion-Based Optimization of Bounding Volume Hierarchies", Computer Graphics Forum, vol. 32, No. 1 [retrieved Dec. 14, 2022]. Retrieved from the Internet <https://core.ac.uk/download/pdf/47173462.pdf>., Jan. 22, 2013, 16 Pages.

Ikeda, Sho, et al., "Multi-Resolution Geometric Representation using Bounding Volume Hierarchy for Ray Tracing", Advanced Micro Devices, Inc. Technical Report [retrieved Dec. 9, 2022]. Retrieved from the Internet <https://gpuopen.com/download/publications/GPUOpen_BVHApproximation.pdf>., Feb. 28, 2022, 6 Pages.

Kajiya, James T, "The Rendering Equation", Proceedings of SIGGRAPH 86, vol. 20, No. 4, [retrieved Dec. 14, 2022]. Retrieved from the Internet <https://dl.acm.org/doi/pdf/10.1145/15922.15902>., Aug. 18, 1986, 8 Pages.

Lauterbach, Christian, "RT-DEFORM: Interactive Ray Tracing of Dynamic Scenes using BVHs", IEEE Symposium on Interactive Ray Tracing [retrieved Dec. 14, 2022]. Retrieved from the Internet <https://koasas.kaist.ac.kr/bitstream/10203/23482/1/paper_rt06.pdf>., Sep. 2008, 8 Pages.

Lee, Won-Jong, et al., "Flexible Ray Traversal with an Extended Programming Model", SA '19: SIGGRAPH Asia 2019 Technical Briefs [retrieved Dec. 9, 2022]. Retrieved from the Internet <https://web.yonsei.ac.kr/wjlee/document/siga2019_lee_preprint.pdf>., Nov. 17, 2019, 4 Pages.

* cited by examiner

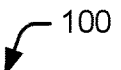
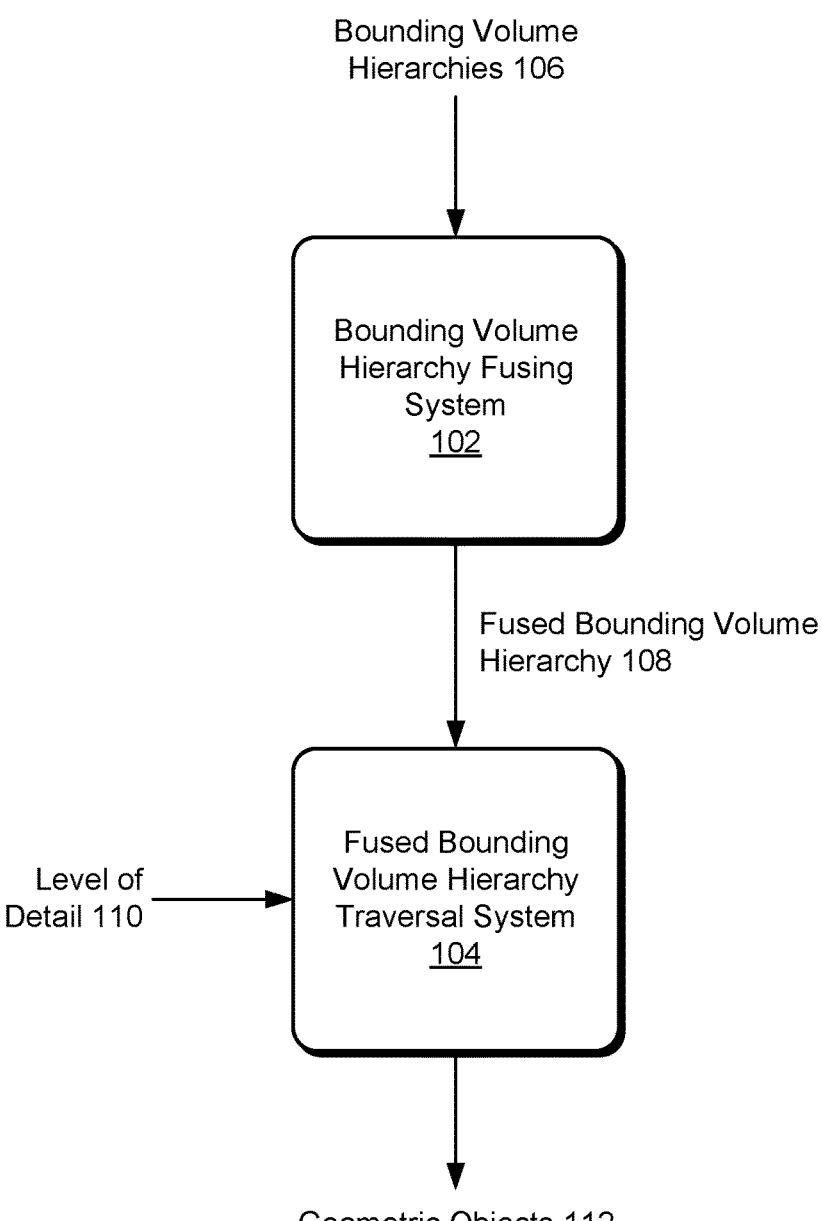
Bounding Volume
Hierarchies 106
Bounding Volume
Hierarchy Fusing
System
102
Fused Bounding Volume
Hierarchy 108
Level of
Detail 110
Fused Bounding
Volume Hierarchy
Traversal System
104
Geometric Objects 112
*Fig. 1*

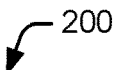
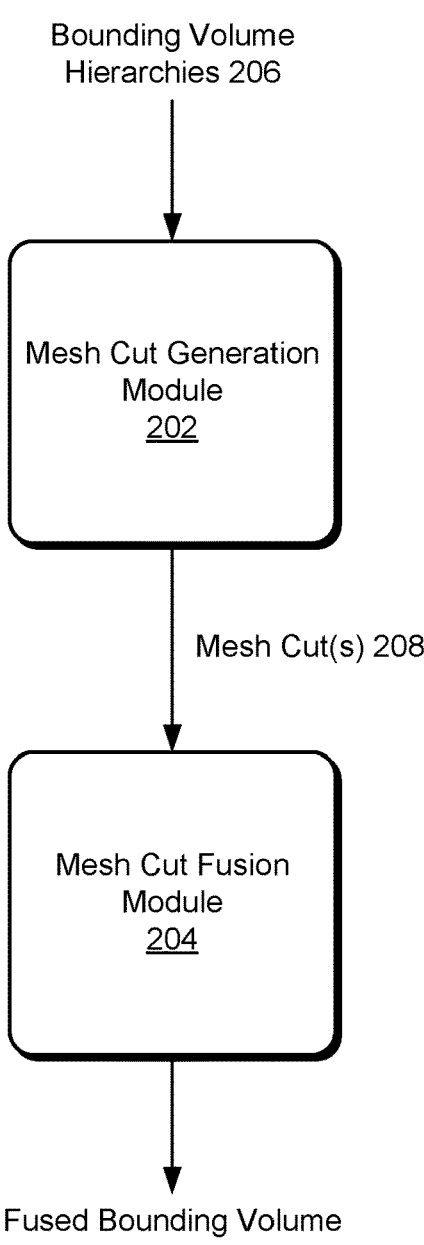
*Fig. 2*

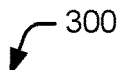
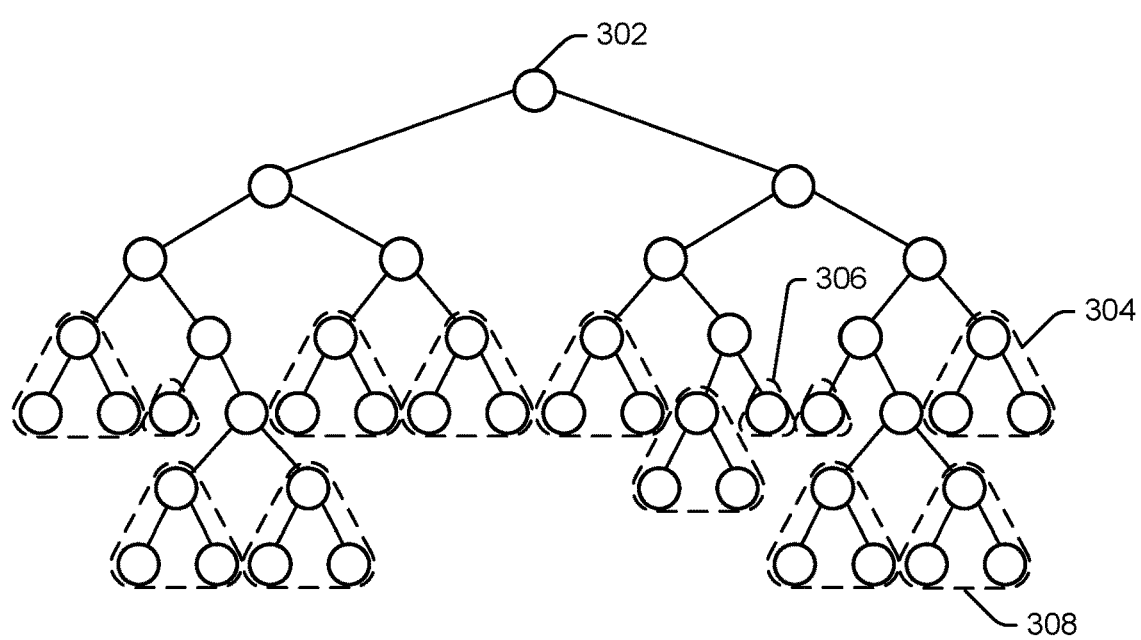
*Fig. 3*

Figure 6:
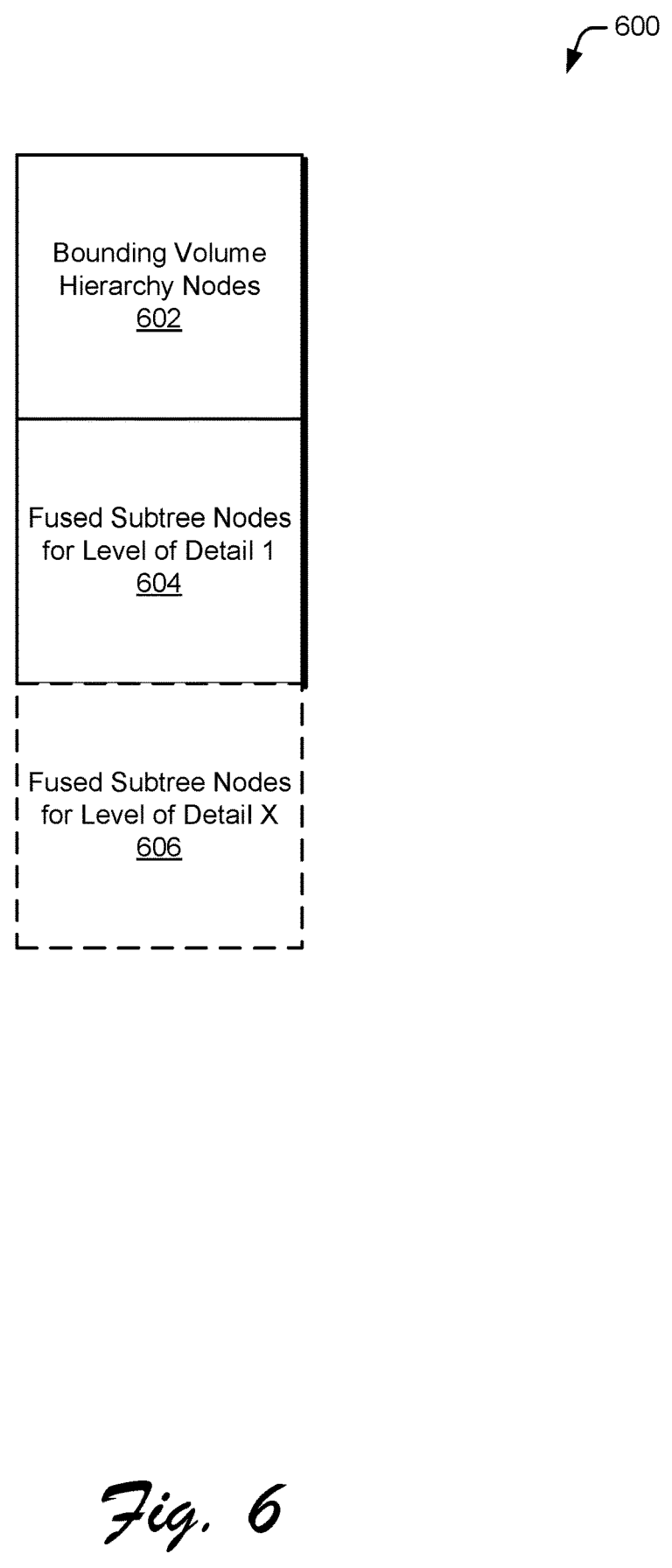

600

Bounding Volume
Hierarchy Nodes
602

Fused Subtree Nodes
for Level of Detail 1
604

Fused Subtree Nodes
for Level of Detail X
606

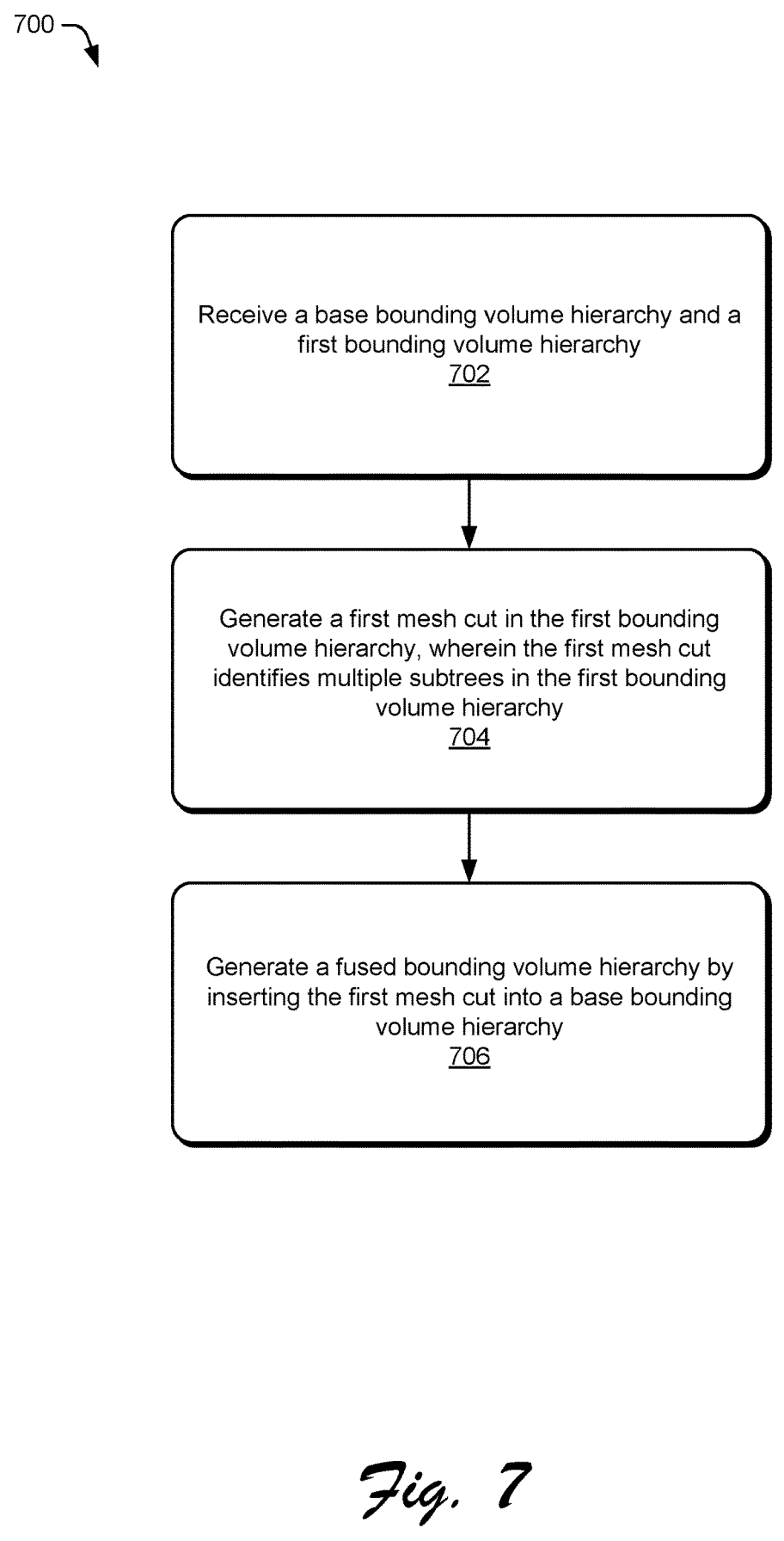

Receive a base bounding volume hierarchy and a
first bounding volume hierarchy
702

Generate a first mesh cut in the first bounding
volume hierarchy, wherein the first mesh cut
identifies multiple subtrees in the first bounding
volume hierarchy
704

Generate a fused bounding volume hierarchy by
inserting the first mesh cut into a base bounding
volume hierarchy
706

*Fig. 7*

800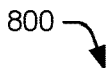

Receive an indication of a first level of detail for a scene corresponding to a first non-base bounding volume hierarchy
802

Identify geometric objects corresponding to the first level of detail by traversing a fused bounding volume hierarchy that includes a mesh cut that identifies multiple subtrees in the first non-base bounding volume hierarchy that are inserted into a base bounding volume hierarchy
804

Output the geometric objects for the scene to a display controller
806

*Fig. 8*

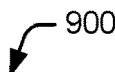
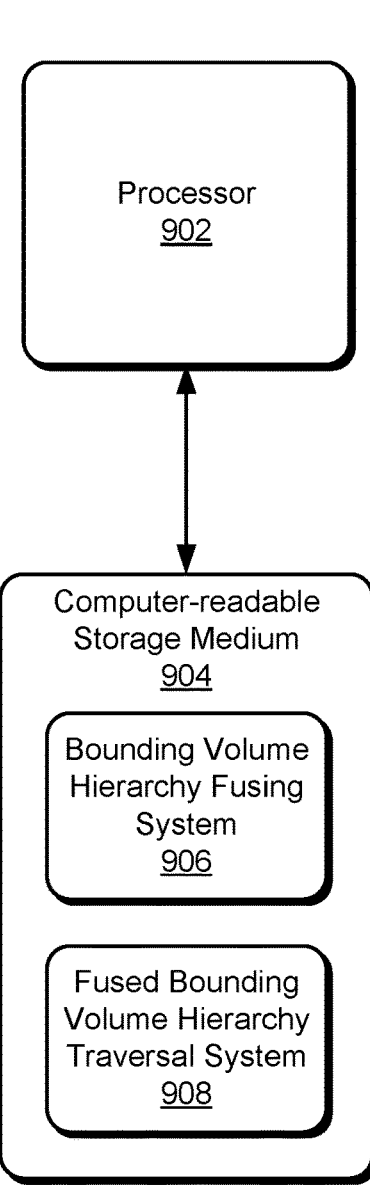
Processor
902
Computer-readable
Storage Medium
904
Bounding Volume
Hierarchy Fusing
System
906
Fused Bounding
Volume Hierarchy
Traversal System
908
*Fig. 9*

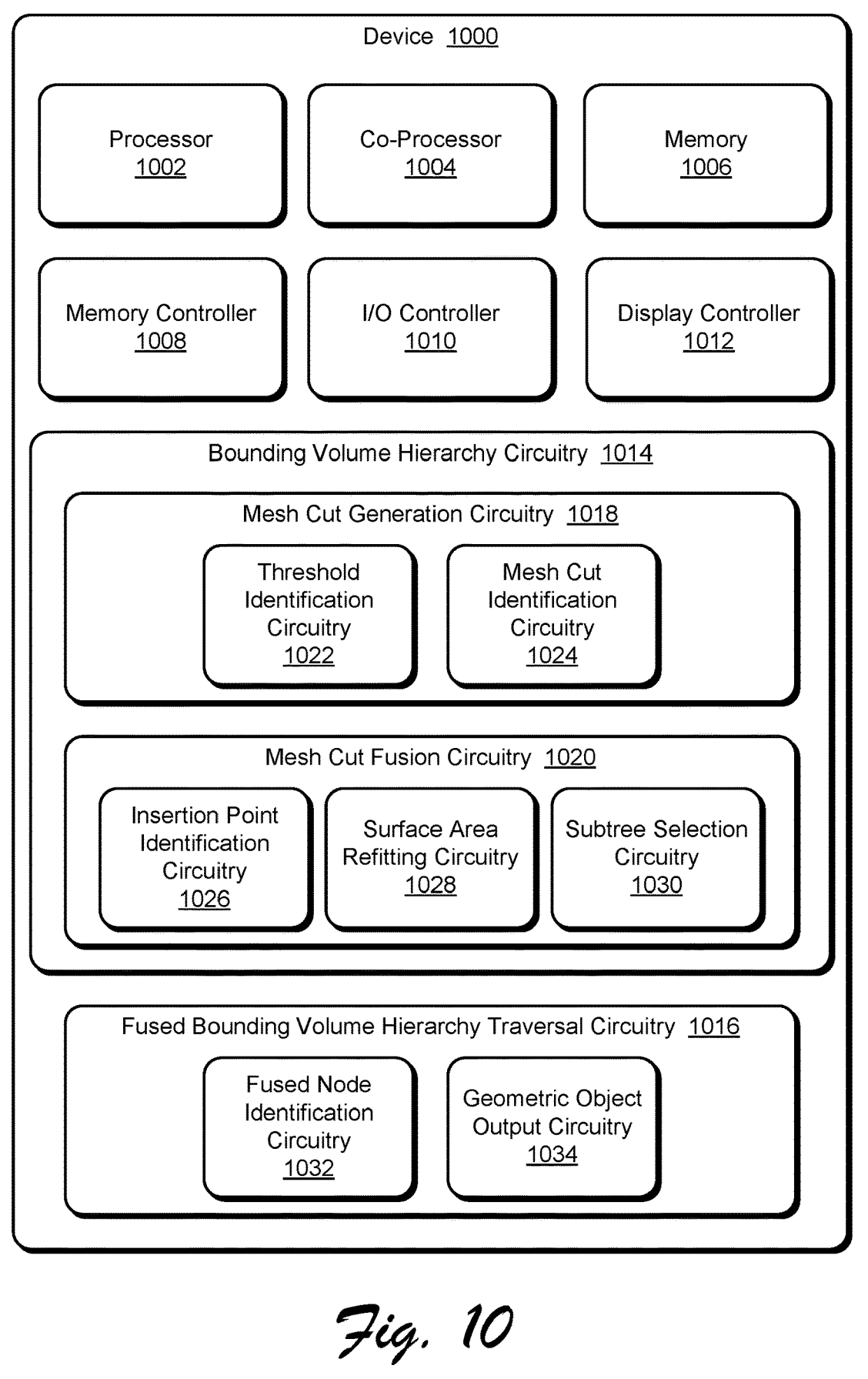

Device 1000

Processor
1002

Co-Processor
1004

Memory
1006

Memory Controller
1008

I/O Controller
1010

Display Controller
1012

Bounding Volume Hierarchy Circuitry 1014

Mesh Cut Generation Circuitry 1018

Threshold
Identification
Circuitry
1022

Mesh Cut
Identification
Circuitry
1024

Mesh Cut Fusion Circuitry 1020

Insertion Point
Identification
Circuitry
1026

Surface Area
Refitting Circuitry
1028

Subtree Selection
Circuitry
1030

Fused Bounding Volume Hierarchy Traversal Circuitry 1016

Fused Node
Identification
Circuitry
1032

Geometric Object
Output Circuitry
1034

Fig. 10

FUSED BOUNDING VOLUME HIERARCHY FOR MULTIPLE LEVELS OF DETAIL

BACKGROUND

Computing devices are commonly used to display graphics, such as for gaming applications, drawing or other artistic applications, and so forth. Various different techniques are used for displaying graphics, such as bounding volume hierarchies. A bounding volume hierarchies are used in various manners, such as when performing ray tracing to display images.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 1 is an illustration of a non-limiting example system that is operable to employ the fused bounding volume hierarchy for multiple levels of detail described herein.

FIG. 2 is an illustration of a system that is operable to generate a fused bounding volume hierarchy.

FIG. 3 illustrates an example of mesh cut in a bounding volume hierarchy.

FIG. 6 illustrates an example memory layout for a fused bounding volume hierarchy.

FIG. 7 is a flow diagram depicting a procedure in an example implementation of fused bounding volume hierarchy for multiple levels of detail.

FIG. 8 is a flow diagram depicting a procedure in another example implementation of fused bounding volume hierarchy for multiple levels of detail.

FIG. 9 illustrates an example system implementing fused bounding volume hierarchy for multiple levels of detail.

FIG. 10 illustrates an example device implementing fused bounding volume hierarchy for multiple levels of detail.

DETAILED DESCRIPTION

Overview

Figure 4:
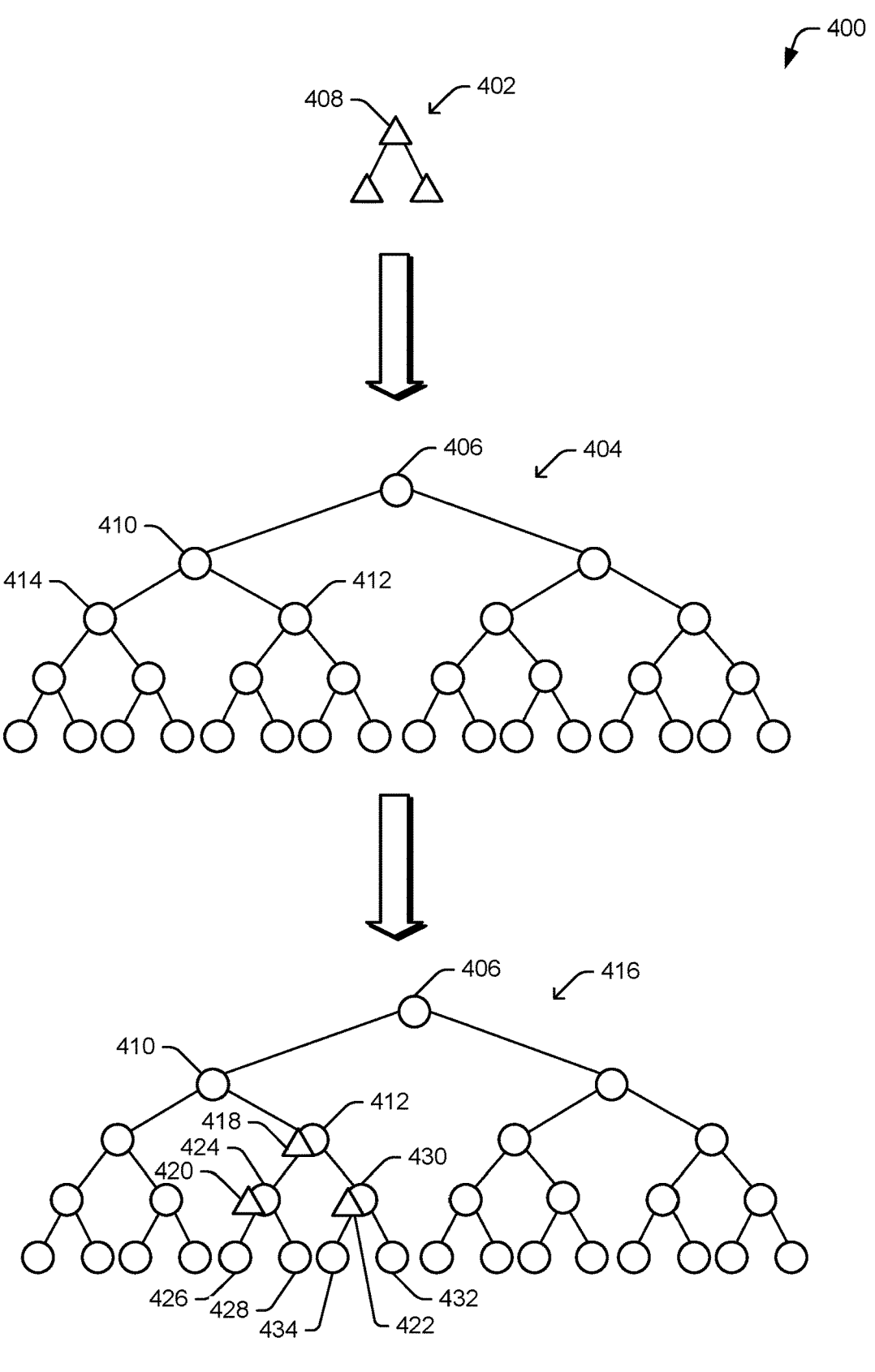
FIG. 4 illustrates an example of locating an insertion point in a bounding volume hierarchy.

A scene or image to be displayed includes multiple geometric objects (e.g., triangle primitives). A bounding volume hierarchy is used to store the geometric objects and different bounding volume hierarchies are used for different levels of detail for the scene or image. For example, a base bounding volume hierarchy includes the highest level of detail that is usable for displaying geometric objects that are to be perceived as closer to the viewer, and one or more non-base bounding volume hierarchies include lower levels of detail that are usable for displaying geometric objects that are to be perceived as farther from the viewer.

The techniques discussed herein generate a fused bounding volume hierarchy, which is a combination of the base bounding volume hierarchy and one or more non-base bounding volume hierarchies. Generally, for each non-base bounding volume hierarchy, multiple subtrees in the non-base bounding volume hierarchy that include less than a threshold number of child nodes are identified. Each of these subtrees is then fused with the base bounding volume hierarchy at one of the nodes of the base bounding volume hierarchy, and an identifier of the level of detail for the non-base bounding volume hierarchy is included in the node. When displaying a scene or image, for a particular portion of the scene or image the level of detail to use is identified. The fused bounding volume hierarchy is traversed and the geometric objects in the nodes of the fused bounding volume hierarchy corresponding to the identified level of detail are displayed.

By using the fused bounding volume hierarchy, multiple levels of detail are merged into a single data structure (the fused bounding volume hierarchy). This reduces data storage requirements because data that is duplicated in the bounding volume hierarchies of different levels of detail does not need to be duplicated. This reduced data storage requirement increases the chances that the data for all levels of detail is maintained in a cache memory of the computing device, alleviating the need to swap data for different levels of detail into and out of the cache memory.

In some aspects, the techniques described herein relate to a method including: receiving a base bounding volume hierarchy and a first bounding volume hierarchy, generating a first mesh cut in the first bounding volume hierarchy, wherein the first mesh cut identifies multiple subtrees in the first bounding volume hierarchy, and generating a fused bounding volume hierarchy by inserting the first mesh cut into a base bounding volume hierarchy.

In some aspects, the techniques described herein relate to a method, the generating the first mesh cut including identifying as the multiple subtrees in the first bounding volume hierarchy subtrees having less than a threshold number of child nodes.

In some aspects, the techniques described herein relate to a method, further including receiving a user input specifying the threshold number.

In some aspects, the techniques described herein relate to a method, further including receiving a second bounding volume hierarchy, and generating a second mesh cut in the second bounding volume hierarchy, wherein the second mesh cut identifies multiple subtrees in the second bounding volume hierarchy, and wherein the generating the fused bounding volume hierarchy further includes inserting the second mesh cut into the base bounding volume hierarchy.

In some aspects, the techniques described herein relate to a method, the generating the fused bounding volume hierarchy including: determining an efficiency cost for each of the multiple subtrees, and inserting the multiple subtrees into the base bounding volume hierarchy in an order from smallest efficiency cost to largest efficiency cost.

In some aspects, the techniques described herein relate to a method, wherein the fused bounding volume hierarchy includes multiple fused nodes in a tree structure, and the generating the fused bounding volume hierarchy includes: selecting a subtree of the multiple subtrees, traversing the base bounding volume hierarchy starting with a root node of the base bounding volume hierarchy, selecting, as an insertion point in the base bounding volume hierarchy for the subtree, a node of the base bounding volume hierarchy having a surface area that does not completely occupy a surface area of the subtree, and inserting the subtree into the base bounding volume hierarchy at the insertion point.

In some aspects, the techniques described herein relate to a method, wherein the fused bounding volume hierarchy includes multiple fused nodes in a tree structure, and the generating the fused bounding volume hierarchy includes setting a flag in a last fused node in each possible path through the fused bounding volume hierarchy indicating that the node is a terminal node.

In some aspects, the techniques described herein relate to a method, wherein the fused bounding volume hierarchy includes multiple nodes in a tree structure, and the generating the fused bounding volume hierarchy includes setting a flag in each of the multiple nodes that does not have a descendant with a terminal flag and a sibling of the node has a descendant indicating that the node is a terminal node.

In some aspects, the techniques described herein relate to a method, wherein the base bounding volume hierarchy includes a highest level of detail for a scene and the first bounding volume hierarchy includes a lower level of detail for the scene.

In some aspects, the techniques described herein relate to a device, including: a processor, and a computer-readable storage medium having stored thereon multiple instructions that, responsive to execution by the processor, cause the processor to perform acts including: receiving a base bounding volume hierarchy and a first bounding volume hierarchy, generating a first mesh cut in the first bounding volume hierarchy, wherein the first mesh cut identifies multiple subtrees in the first bounding volume hierarchy, and generating a fused bounding volume hierarchy by inserting the first mesh cut into a base bounding volume hierarchy.

In some aspects, the techniques described herein relate to a device, the generating the first mesh cut including identifying as the multiple subtrees in the first bounding volume hierarchy subtrees having less than a threshold number of child nodes.

In some aspects, the techniques described herein relate to a device, the acts further including receiving a user input specifying the threshold number.

In some aspects, the techniques described herein relate to a device, the acts further including receiving a second bounding volume hierarchy, and generating a second mesh cut in the second bounding volume hierarchy, wherein the second mesh cut identifies multiple subtrees in the second bounding volume hierarchy, and wherein the generating the fused bounding volume hierarchy further comprises inserting the second mesh cut into the base bounding volume hierarchy.

In some aspects, the techniques described herein relate to a device, the generating the fused bounding volume hierarchy including: determining an efficiency cost for each of the multiple subtrees, and inserting the multiple subtrees into the base bounding volume hierarchy in an order from smallest efficiency cost to largest efficiency cost.

In some aspects, the techniques described herein relate to a device, wherein the fused bounding volume hierarchy comprises multiple fused nodes in a tree structure, and the generating the fused bounding volume hierarchy comprises setting a flag in a last fused node in each possible path through the fused bounding volume hierarchy indicating that the node is a terminal node.

In some aspects, the techniques described herein relate to a device, wherein the base bounding volume hierarchy includes a highest level of detail for a scene and the first bounding volume hierarchy includes a lower level of detail for the scene.

In some aspects, the techniques described herein relate to a device, wherein the fused bounding volume hierarchy includes multiple fused nodes in a tree structure, and generating the fused bounding volume hierarchy includes: selecting a subtree of the multiple subtrees, traversing the base bounding volume hierarchy starting with a root node of the base bounding volume hierarchy, selecting, as an insertion point in the base bounding volume hierarchy for the subtree, a node of the base bounding volume hierarchy having a surface area that does not completely occupy a surface area of the subtree, and inserting the subtree into the base bounding volume hierarchy at the insertion point.

In some aspects, the techniques described herein relate to a system, including: a fused node identification circuitry to receive an indication of a first level of detail for a scene corresponding to a first non-base bounding volume hierarchy, and a geometric object output circuitry to identify geometric objects corresponding to the first level of detail by traversing a fused bounding volume hierarchy that includes a mesh cut that identifies multiple subtrees in the first non-base bounding volume hierarchy that are inserted into a base bounding volume hierarchy and output the geometric objects for the scene to a display controller.

In some aspects, the techniques described herein relate to a system, wherein the indication of the level of detail for the scene indicates a lower level of detail than a highest level of detail for the scene, and traversing the fused bounding volume hierarchy includes identifying a node in the fused bounding volume hierarchy where a subtree corresponding to the first level of detail has been inserted, and traversing the subtree.

In some aspects, the techniques described herein relate to a system, wherein the fused node identification circuitry is to receive an indication of a second level of detail for a scene corresponding to a second non-base bounding volume hierarchy, and the geometric object output circuitry is to identify geometric objects corresponding to the second level of detail by traversing the fused bounding volume hierarchy that includes a mesh cut that identifies multiple subtrees in the second non-base bounding volume hierarchy that are inserted into the base bounding volume hierarchy.

FIG. 1 is an illustration of a non-limiting example system 100 that is operable to employ the fused bounding volume hierarchy for multiple levels of detail described herein. The system 100 includes a bounding volume hierarchy fusing system 102 and a fused bounding volume hierarchy traversal system 104. The bounding volume hierarchy fusing system 102 receives multiple bounding volume hierarchies 106, one bounding volume hierarchy for each of multiple levels of detail for a scene. The bounding volume hierarchy fusing system 102 generates a fused bounding volume hierarchy 108 from the multiple bounding volume hierarchies 106.

The multiple bounding volume hierarchies 106 include a base bounding volume hierarchy that includes a highest level of detail for a scene or image (also referred to as a base level of detail), and one or more additional bounding volume hierarchies (also referred to as non-base level of detail bounding volume hierarchies) that each include a lower level of detail for the scene or image. The level of detail for a bounding volume hierarchy or a scene or image refers to an amount of information or details that are used for the bounding volume hierarchy to represent the scene or image (e.g., how many geometric objects such as triangle primitives are included in the bounding volume hierarchy or are used to represent the scene or image). A bounding volume hierarchy having a higher level of detail includes more information or details (e.g., more geometric objects such as triangle primitives) for a scene or image than a bounding volume hierarchy having a lower level of detail, and a bounding volume hierarchy having a lower level of detail includes less information or details (e.g., fewer geometric objects such as triangle primitives) for the scene or image than a bounding volume hierarchy having a higher level of detail.

Each of the multiple bounding volume hierarchies 106 has a corresponding level of detail indicator that is represented in any of a variety of different manners. As one example, the level of detail indicators are numeric (e.g., 0, 1, 2, 3, etc. with 0 being the base bounding volume hierarchy and indicators that are larger values corresponding to lower levels of detail than indicators that are smaller values). As another example, the level of detail indicators are alphabetic (e.g., A, B, C, etc. with level A being the base bounding volume hierarchy and indicators that are later in the alphabet corresponding to lower levels of detail than indicators that are earlier in the alphabet).

The fused bounding volume hierarchy traversal system 104 receives the fused bounding volume hierarchy 108 as well as a level of detail 110. The level of detail 110 is received from any of various sources, such as an application or software function, a user of the system 100, and so forth. The level of detail 110 indicates the level of detail that is to be used to display the scene. The fused bounding volume hierarchy traversal system 104 traverses the fused bounding volume hierarchy 108, identifies the geometric objects that correspond to the level of detail 110, and outputs those geometric objects as geometric objects 112.

The bounding volume hierarchy fusing system 102 and the fused bounding volume hierarchy traversal system 104 are implementable in any of hardware, software, firmware, or a combination thereof, including a processor, a controller, a co-processor (e.g., a graphics processing unit (GPU), a parallel accelerated processor), and so forth running software or firmware to implement the techniques discussed herein.

In one or more implementations, the system 100 is implemented on a single device, such as a general purpose computer or a processor. In such situations, generation of the fused bounding volume hierarchy 108 and outputting of the geometric objects 112 is performed by the same device. Additionally or alternatively, the system 100 is implemented across multiple devices (e.g., different general purpose computers or different processors). In such situations, generation of the fused bounding volume hierarchy 108 is performed on a different device than the outputting of the geometric objects 112 is performed by the same device.

FIG. 2 is an illustration of a system 200 that is operable to generate a fused bounding volume hierarchy. The system 200 is, for example, a bounding volume hierarchy fusing system 102 of FIG. 1. The system 200 includes a mesh cut generation module 202 and a mesh cut fusion module 204. The mesh cut generation module 202 receives multiple bounding volume hierarchies 206, one bounding volume hierarchy for each of multiple levels of detail for a scene. The multiple bounding volume hierarchies 206 are, for example, the multiple bounding volume hierarchies 106 of FIG. 1. The mesh cut generation module 202 and the mesh cut fusion module 204 are each implementable in any of hardware, software, firmware, or a combination thereof, including a processor, a controller, a co-processor (e.g., a GPU, a parallel accelerated processor), and so forth running software or firmware to implement the techniques discussed herein.

For each non-base bounding volume hierarchy, the mesh cut generation module 202 traverses the bounding volume hierarchy and identifies a mesh cut in the bounding volume hierarchy. The mesh cut is a collection of subtrees in the bounding volume hierarchy that have less than or equal to a threshold number of child nodes. A child node of a given node refers to any node that is below the given node in the bounding volume hierarchy, including nodes at the next level below the given node in the bounding volume hierarchy or any other levels below the given node in the bounding volume hierarchy.

In one or more implementations, the multiple bounding volume hierarchies 206 include a base bounding volume hierarchy (also referred to as a base level of detail bounding volume hierarchy) and one or more non-base bounding volume hierarchies (also referred to as non-base level of detail bounding volume hierarchies). The mesh cut generation module 202 generates a mesh cut 208 for each non-base bounding volume hierarchy.

FIG. 3 illustrates an example of mesh cut in a bounding volume hierarchy 300. The bounding volume hierarchy 300 is for a non-base bounding volume hierarchy and includes multiple nodes in a tree structure (e.g., a binary tree), illustrated as circles. The bounding volume hierarchy 300 includes a root node 302 and the bounding volume hierarchy 300 is traversed (e.g., starting at the root node 302) to identify nodes having less than or equal to a threshold number of child nodes. This threshold number of child nodes is received (e.g., by the mesh cut generation module 202 of FIG. 2) from any of various sources, such as an application or software function, a user of the system 100, and so forth. In one or more implementations, the threshold number of child nodes is the same for each non-base level of detail bounding volume hierarchy. Additionally or alternatively, two or more non-base level of detail bounding volume hierarchies have different threshold numbers of child nodes. The bounding volume hierarchy 300 is traversed using any of a variety of public or proprietary tree traversal techniques.

The bounding volume hierarchy 300 is traversed, for example until all of the leaf nodes have been added to the mesh cut. The mesh cut includes all of the subtrees having less than or equal to the threshold number of child nodes. In the illustrated example of FIG. 3, the threshold number is 3. Subtrees are illustrated with dashed-line triangles. For example, the mesh cut includes subtrees 304, 306, 308, and so forth.

All of the geometric objects (e.g., triangle primitives) in the bounding volume hierarchy 300 are included in the mesh cut for the bounding volume hierarchy 300. Accordingly, when the mesh cut is fused into the base bounding volume hierarchy as discussed in more detail below, the fused bounding volume hierarchy has all the geometric objects (e.g., triangle primitives) for the base bounding volume hierarchy and the non-base bounding volume hierarchy.

Returning to FIG. 2, the threshold (the threshold number of child nodes) is a value used by the mesh cut generation module 202 and is determined in any of a variety of different manners. In one or more implementations, the threshold is pre-configured in the mesh cut generation module 202, such as hard-coded into the mesh cut generation module 202 at the time the mesh cut generation module 202 is created, retrieved from another source (e.g., another program, an external server), and so forth. Additionally or alternatively, the threshold is specified by user input or user preference settings. In setting the threshold, various factors are optionally taken into consideration. For example, as the threshold gets smaller the number of subtrees in the mesh cut increases. This increase in the number of subtrees in the mesh cut improves the memory compaction of using the fused bounding volume hierarchy but decreases the performance of traversing the fused bounding volume hierarchy. Similarly, as the threshold gets larger the number of subtrees in the mesh cut decreases, which reduces the memory compaction of using the fused bounding volume hierarchy but increases the performance of traversing the fused bounding volume hierarchy.

The mesh cut generation module 202 generates a mesh cut for each non-base bounding volume hierarchy. The mesh cut generation module 202 outputs the generated mesh cut for a non-base bounding volume hierarchy to the mesh cut fusion module 204 as one of mesh cut(s) 208. The mesh cut generation module 202 outputs a different mesh cut 208 for each of the multiple non-base bounding volume hierarchies 206.

For each of the mesh cut(s) 208, the mesh cut fusion module 204 inserts the various subtrees in the mesh cut 208 into the base bounding volume hierarchy. Accordingly, in situations in which there are mesh cuts for multiple non-base bounding volume hierarchies (each corresponding to a different level of detail), the various subtrees in each of these multiple mesh cuts are inserted into the base bounding volume hierarchy. The subtrees for multiple mesh cuts are inserted into the base bounding volume hierarchy on mesh cut by mesh cut basis (also referred to as a non-base bounding volume hierarchy by non-base bounding volume hierarchy basis), and the mesh cuts are prioritized in any of various manners as discussed in more detail below. For example, if there are three mesh cuts to be inserted into the base bounding volume hierarchy, the mesh cut fusion module 204 first inserts the subtrees of the highest priority mesh cut, then inserts the subtrees of the second highest priority mesh cut, then interest the subtrees of the lowest priority mesh cut.

Insertion of a subtree into the base bounding volume hierarchy is based on the surface areas of the various nodes of the base bounding volume hierarchy and the subtree. Each leaf node in a bounding volume hierarchy includes a geometric object (e.g., a triangle primitive) that is displayed in a scene. The surface area of a leaf node is the surface area in the scene that is covered by a bounding box (e.g., a rectangle) that encompasses the geometric object in the leaf node, such as an axis-aligned bounding-box (AABB). The surface area of a given higher level node (higher than a leaf node) is a bounding box (e.g., a rectangle) that encompasses the bounding boxes of each of the lower level nodes (each of the nodes lower than the given node in the bounding volume hierarchy).

To insert a mesh cut 208 into the base bounding volume hierarchy, the mesh cut fusion module 204 selects a subtree from the mesh cut and starts at the root node of the base bounding volume hierarchy. If the surface area of the root node of the base bounding volume hierarchy completely occupies the surface area of the subtree (e.g., as indicated by the surface area of the root node of the subtree), the mesh cut fusion module 204 moves down one level in the base bounding volume hierarchy to a node having an associated surface area that completely occupies the surface area of the subtree. Eventually, a node of the base bounding volume hierarchy has two child nodes and none of the child nodes has a surface area that completely occupies the surface area of the subtree. When that occurs, the one of the two child nodes having a surface area that overlaps the surface area of the subtree the most is selected as the insertion point for the subtree.

FIG. 4 illustrates an example 400 of locating an insertion point in a bounding volume hierarchy. In the example 400, a subtree 402 with three nodes, illustrated as triangles, is to be fused with the bounding volume hierarchy 404. The bounding volume hierarchy 404 is the base bounding volume hierarchy (e.g., level of detail 0) and the subtree 402 is a subtree of a mesh cut of a non-base bounding volume hierarchy (e.g., level of detail 1). The mesh cut fusion module 204 starts at root node 406 and determines that the surface area of the root node 406 completely occupies the surface area of the subtree 402 (e.g., as indicated by the surface area of the root node 408 of the subtree 402). The mesh cut fusion module 204 moves down one level to the node 410 and determines that none of the nodes 412 and 414 occupies the surface area of the subtree 402. The mesh cut fusion module 204 determines that the node 412 has a surface area that overlaps the surface area of the subtree 402 more than the surface area of the node 414, and selects the node 412 as the insertion point for the subtree 402. The fused bounding volume hierarchy 416 is illustrated as including the three triangle nodes of the subtree 402, illustrated as node 418, node 420, and node 422.

In one or more implementations, inserting a subtree into a bounding volume hierarchy refers to adding, at the insertion point, a reference to or identifier of the root node of the subtree. For example, in the example 400 a reference to or identifier of root node 408 of the subtree 402 is added to the node 412. An indication of the level of detail for the subtree 402 is also added to the node 412, which allows the fused bounding volume hierarchy 416 to support multiple levels of detail.

Accordingly, during traversal of the fused bounding volume hierarchy 416, the fused bounding volume hierarchy traversal system 104 of FIG. 1 uses the proper subtree, based on the level of detail 110, to obtain the geometric objects for the scene. For example, if the level of detail is level 1 (e.g., the level of detail for the subtree 402), the nodes of the subtree 402 in the fused bounding volume hierarchy 416 (node 418, node 420, and node 422) are traversed to obtain the geometric objects for the scene. However, if the level of detail is level 0 (e.g., the level of detail for the base bounding volume hierarchy), the nodes of the base bounding volume hierarchy 404 (node 424, node 426, node 428, node 430, node 432, and node 434) are traversed to obtain the geometric objects for the scene.

In some situations the surface area of a node at an insertion point does not include all of the surface area of the subtree that was inserted. In such situations, the mesh cut fusion module 204 refits the surface areas of the nodes in the fused bounding volume hierarchy 416 that are above the node. Refitting the surface area of a node refers to adjusting the surface area of the node to include all of the surface area in the lower node. For example, assume the surface area of the node 412 does not include all of the surface area of the subtree 402. The mesh cut fusion module 204 adjusts the surface area of the node 412 to include all of the surface area of the subtree 402. Similarly, the surface area of the node 410 is adjusted to include all of the surface area of the node 412 (after having been adjusted to include all of the surface area of the subtree 402), and the surface area of the node 406 is adjusted to include all of the surface area of the node 410 (after having been adjusted to include all of the surface area of the node 412).

Returning to FIG. 2, the mesh cut fusion module 204 optionally takes into account various additional factors in determining the insertion points for subtrees. In one or more implementations, the mesh cut fusion module 204 limits the number of subtrees that are inserted at each node. In one example, the mesh cut fusion module 204 inserts no more than one subtree at any given node. If the mesh cut fusion module 204 determines that the insertion point for a subtree is at a node at which another subtree has already been inserted, the mesh cut fusion module 204 moves down to the next lower level in the base bounding volume hierarchy and selects as the insertion point for the subtree the node in that level that has a surface area that overlaps the surface area of the subtree the most.

In one or more implementations, after all the nodes of the subtrees have been inserted into the fused bounding volume hierarchy, the mesh cut fusion module 204 sets a flag in the last fused node (the last node from a subtree) in each possible path through the fused bounding volume hierarchy. This flag indicates that the node is a terminal node for the level of detail and is used during traversal of the fused bounding volume hierarchy to determine when to stop traversing the fused bounding volume hierarchy for a particular level of detail. The last fused node in each possible path is determined in any of a variety of manners, such as a bottom-up traversal of the fused bounding volume hierarchy.

It is possible for situations to arise in which there is no node tagged as the terminal node for a level of detail. In such situations, the mesh cut fusion module 204 traverses the fused bounding volume hierarchy and any node that does not have a descendant with a terminal flag and the sibling of the node has a descendant with a terminal flag has a flag set indicating that the node is a terminal node.

The mesh cut fusion module 204 determines the order in which subtrees are selected from a mesh cut in accordance with any of a variety of different rules or conditions. In one or more implementations, the mesh cut fusion module 204 determines an efficiency cost of the root node of each subtree in the mesh cut and selects the subtrees based on efficiency costs, such as from smallest efficiency cost to largest efficiency cost. This results in subtrees with higher or larger efficiency costs being at lower depths of the fused bounding volume hierarchy than subtrees with smaller or lower efficiency costs because if the same node is identified as an insertion point for two subtrees then the subtree having the smallest efficiency cost is inserted first, resulting in the subtree having the higher efficiency cost being at a higher depth of the fused bounding volume hierarchy. Having subtrees with smaller efficiency costs at lower depths of the fused bounding volume hierarchy results in less refitting of nodes in the fused bounding volume hierarchy.

The efficiency cost of a node refers to how compact the node is from a surface area perspective. In one or more implementations, the mesh cut fusion module 204 determines the efficiency cost of a node as the relative increase of the surface area of the node with respect to the average surface areas of the children of the node. Accordingly, if there is a lot of empty space inside the node the efficiency cost of the node will be small. This relative increase is determined in various manners, such as dividing the surface area of the node by the average of the surface areas of the child nodes of the node.

Additionally or alternatively, the mesh cut fusion module 204 determines the efficiency cost of the node as the increase of the surface area of the node with respect to the smallest surface area of the children of the node. This handles the situation when the node contains child nodes of significantly different sizes (e.g., one large node representing the whole terrain of a scene and a small node representing a particular object on the terrain). This increase of the surface area of the node is determined in various manners, such as dividing the surface area of the node by the smallest surface area of the child nodes of the node.

Additionally or alternatively, the mesh cut fusion module 204 determines the efficiency cost of the node as the surface area of the node.

Additionally or alternatively, a final efficiency cost of a node is determined based on these various efficiency costs of the node. Examples of determining the final efficiency cost include multiplying two or three of these efficiency costs together, averaging two or three of these efficiency costs, generating a weighted average of two or three of these efficiency costs, and so forth.

The mesh cut fusion module 204 outputs the fused bounding volume hierarchy as fused bounding volume hierarchy 210. The fused bounding volume hierarchy 210 is used in any of a variety of different manners, such as to display a scene or image (e.g., for ray tracing).

Although a subtree for a single level of detail is illustrated in FIG. 4, in one or more implementations subtrees for any number of levels of detail are inserted into the fused bounding volume hierarchy 416. The level of detail for a subtree is added to the node of the fused bounding volume hierarchy 416 at the insertion point, allowing different levels of detail to be traversed.

Figure 5:
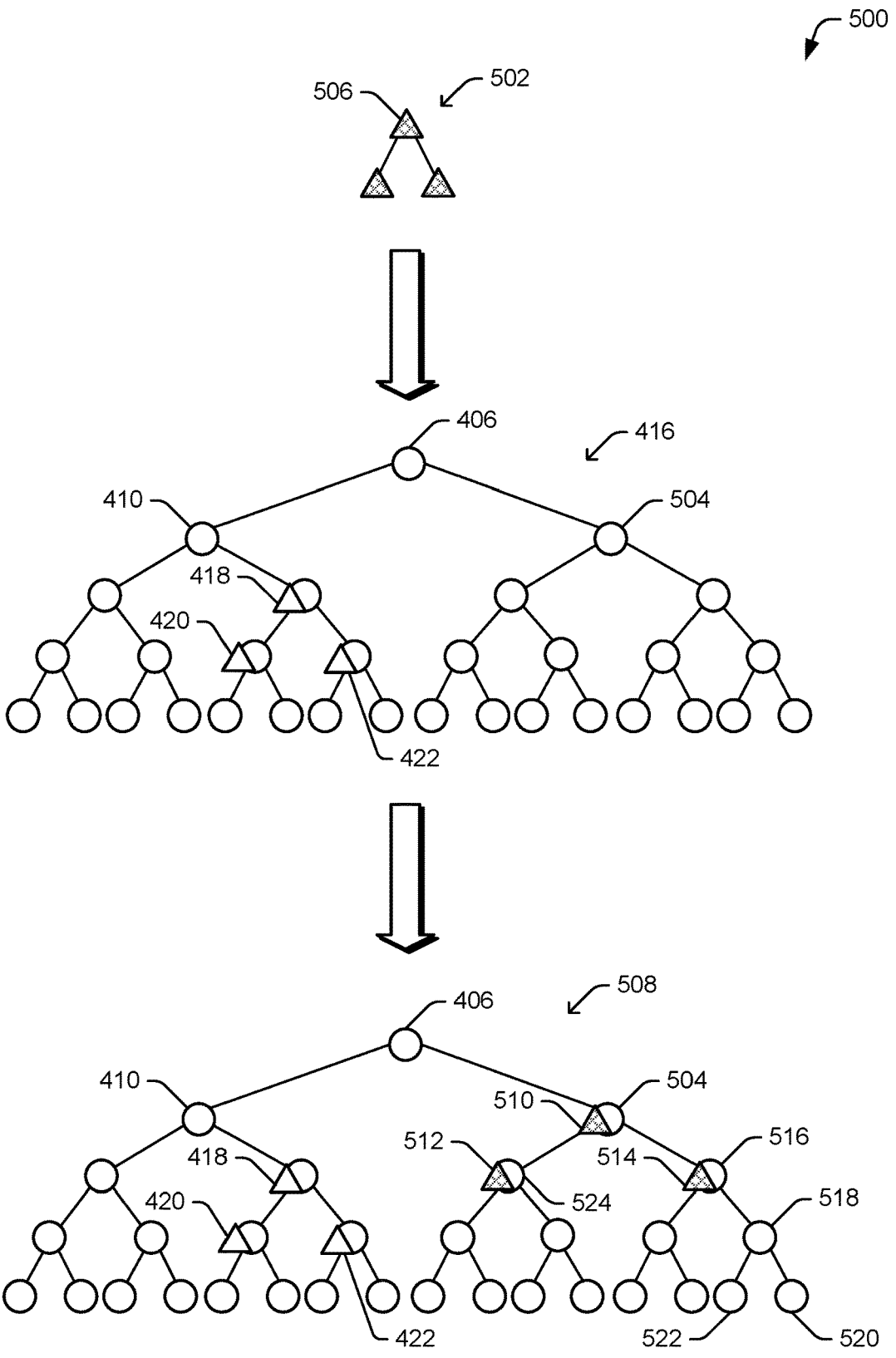
FIG. 5 illustrates another example of locating an insertion point in a bounding volume hierarchy.

FIG. 5 illustrates another example 500 of locating an insertion point in a bounding volume hierarchy. In the example 500, a subtree 502 with three nodes, illustrated as triangles with cross hatching, is to be fused with the bounding volume hierarchy 416 (from FIG. 4). The subtree 502 is a subtree of a mesh cut of a non-base bounding volume hierarchy (e.g., level of detail 2). The mesh cut fusion module 204 starts at root node 406 and determines that that none of the nodes 410 and 504 occupies the surface area of the subtree 502. The mesh cut fusion module 204 determines that the node 504 has a surface area that overlaps the surface area of the subtree 502 more than the surface area of the node 410 (e.g., as indicated by the surface area of the root node 506 of the subtree 502), and selects the node 504 as the insertion point for the subtree 502. The fused bounding volume hierarchy 508 is illustrated as including the three triangle nodes of the subtree 502, illustrated as node 510, node 512, and node 514.

Accordingly, during traversal of the fused bounding volume hierarchy 508, the fused bounding volume hierarchy traversal system 104 of FIG. 1 uses the proper subtree, based on the level of detail 110, to obtain the geometric objects for the scene. For example, if the level of detail is level 2 (e.g., the level of detail for the subtree 502), the nodes of the subtree 502 in the fused bounding volume hierarchy 508 (node 510, node 512, and node 514) are traversed to obtain the geometric objects for the scene. However, if the level of detail is level 0 (e.g., the level of detail for the base bounding volume hierarchy), the nodes of the base bounding volume hierarchy (illustrated with circles as node 504 as well as the nodes (illustrated as circles) below node 504 such as node 516, node 518, node 520, node 522, node 524, and so forth) are traversed to obtain the geometric objects for the scene.

Returning to FIG. 1, the fused bounding volume hierarchy traversal system 104 receives fused bounding volume hierarchy 108 (e.g., the fused bounding volume hierarchy 210 of FIG. 2). The fused bounding volume hierarchy traversal system 104 traverses the fused bounding volume hierarchy 108 by starting with the root node of the fused bounding volume hierarchy 108. At each node in the fused bounding volume hierarchy 108 the fused bounding volume hierarchy traversal system 104 checks whether there is a fused node corresponding to the received level of detail 110. If there is a fused node corresponding to the received level of detail 110, the fused bounding volume hierarchy traversal system 104 traverses the subtree that is fused to the node. After traversing the subtree, the fused bounding volume hierarchy traversal system 104 checks whether the terminal flag for the received level of detail 110 is set for the node. If the terminal flag is set then the fused bounding volume hierarchy traversal system 104 skips traversing the children of the node. However, if the terminal flag is not set, the fused bounding volume hierarchy traversal system 104 continues traversing the fused bounding volume hierarchy 108.

FIG. 6 illustrates an example memory layout 600 for a fused bounding volume hierarchy. The memory layout 600 illustrates that the fused bounding volume hierarchy is laid out as the bounding volume hierarchy nodes 602 followed by the fused subtree nodes 604 for a 1S level of detail (e.g., level of detail 1). If there are any additional levels of detail, the fused nodes for those levels of detail follow the fused subtree nodes 604, illustrated as fused subtree nodes 606. As illustrated, a separate bounding volume hierarchy need not be stored in memory for each non-base level of detail (e.g., level of detail 1) as the nodes are already stored as part of bounding volume hierarchy nodes 602.

FIG. 7 is a flow diagram 700 depicting a procedure in an example implementation of fused bounding volume hierarchy for multiple levels of detail. The flow diagram 700 is performed by a bounding volume hierarchy fusing system, such as bounding volume hierarchy fusing system 102 of FIG. 1.

In this example, a base bounding volume hierarchy and a first bounding volume hierarchy are received (block 702).

A first mesh cut in the first bounding volume hierarchy is generated (block 704). The first mesh cut identifies multiple subtrees in the first bounding volume hierarchy.

A fused bounding volume hierarchy is generated by inserting the first mesh cut into a base bounding volume hierarchy (block 706). This inserts the multiple subtrees from the first bounding volume hierarchy into the base bounding volume hierarchy.

FIG. 8 is a flow diagram 800 depicting a procedure in an example implementation of fused bounding volume hierarchy for multiple levels of detail. The flow diagram 800 is performed by a fused bounding volume hierarchy traversal system, such as fused bounding volume hierarchy traversal system 104 of FIG. 1.

In this example, an indication of a first level of detail for a scene corresponding to a first non-base bounding volume hierarchy received (block 802).

Geometric objects corresponding to the first level of detail are identified by traversing a fused bounding volume hierarchy that includes a mesh cut that identifies multiple subtrees in the first non-base bounding volume hierarchy that are inserted into a base bounding volume hierarchy (block 804).

The geometric objects for the scene are output to a display controller (block 806).

The various functional units illustrated in the figures and/or described herein (including, where appropriate, the bounding volume hierarchy fusing system 102, the fused bounding volume hierarchy traversal system 104, the mesh cut generation module 202, and the mesh cut fusion module 204) are implemented in any of a variety of different manners such as hardware circuitry, software executing or firmware executing on a programmable processor, a controller, a co-processor (e.g., a (GPU), a parallel accelerated processor), and so forth, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a GPU, a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

FIG. 9 illustrates an example system 900 implementing fused bounding volume hierarchy for multiple levels of detail. The system 900 includes a processor 902 and a computer-readable storage medium 904, which in one or more examples is any of a variety of non-transitory computer-readable storage mediums as discussed above. The computer-readable storage medium 904 has stored thereon instructions for a bounding volume hierarchy fusing system 906 (such as the bounding volume hierarchy fusing system 102 of FIG. 1) and a fused bounding volume hierarchy traversal system 908 (such as the fused bounding volume hierarchy traversal system 104). Responsive to execution by the processor, the instructions for the bounding volume hierarchy fusing system 906 and the fused bounding volume hierarchy traversal system 908 cause the processor 902 to perform various acts as discussed above.

FIG. 10 illustrates an example device 1000 implementing fused bounding volume hierarchy for multiple levels of detail. The device 1000 includes a processor 1002, a co-processor 1004, a memory 1006, a memory controller 1008, an input/output (I/O) controller 1010, a display controller 1012, a bounding volume hierarchy circuitry 1014, and a fused bounding volume hierarchy traversal circuitry 1016. In one or more implementations the device 1000 further includes a system bus or other data and command transfer system that couples the various components to one another. Such a system bus includes any one or combination of different bus structures that include control and data lines, such as a memory bus, a peripheral bus, a universal serial bus, a processor or local bus, that utilizes any of a variety of bus architectures.

The processor 1002 includes circuitry or other hardware elements, such as an integrated circuit. The processor 1002 is, for example, one or more central processing units (CPUs) having one or more cores, a core of a CPU, and so forth. The co-processor 1004 also includes circuitry or other hardware elements, such as an integrated circuit. The co-processor 1004 is, for example, a GPU, a parallel accelerated processor, and so forth.

The memory 1006 includes volatile media (such as random access memory (RAM)) and/or nonvolatile media (such as read only memory (ROM), Resistive RAM (ReRAM), Flash memory, Ferroelectric Random Access Memory (Fe-RAM), or 3D Xpoint memory, optical disks, magnetic disks, and so forth). The memory controller 1008 manages access to the memory 1006 for the processor 1002 and the co-processor 1004, communicating memory requests (e.g., read and write requests) to the memory 1006 and receiving responses (e.g., data, confirmation, etc.) from the memory 1006.

The I/O controller 1010 allows a user to enter commands and information to the device 1000, and also allows information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., employing visible or non-visible wavelengths such as infrared frequencies), and so forth. Examples of output devices include a display device (e.g., a monitor or projector), speakers, a printer, a network card, tactile-response device, and so forth.

The display controller 1012 allows information or data to be displayed to the user. Although illustrated as separate, the display controller 1012 be included as part of the I/O controller 1010. The display controller 1012 communicates with a display via any of a variety of wired (e.g., Universal Serial Bus (USB), IEEE 13104, High-Definition Multimedia Interface (HDMI)) or wireless (e.g., Wi-Fi, Bluetooth, infrared (IR)) connections.

The device 1000 includes a bounding volume hierarchy circuitry 1014 and a fused bounding volume hierarchy traversal circuitry 1016. The bounding volume hierarchy circuitry 1014 and the fused bounding volume hierarchy traversal circuitry 1016 are each hardware circuitry such as application specific integrated circuits (ASICs), field programmable gate array (FPGA) circuits, a complex programmable logic device (CPLD), or any other type of integrated circuit (IC). Although device 1000 is illustrated as including both the bounding volume hierarchy circuitry 1014 and the fused bounding volume hierarchy traversal circuitry 1016, the bounding volume hierarchy circuitry 1014 and the fused bounding volume hierarchy traversal circuitry 1016 are optionally implemented on different devices 1000.

The bounding volume hierarchy circuitry 1014 includes a mesh cut generation circuitry 1018 and a mesh cut fusion circuitry 1020. The mesh cut generation circuitry 1018 is, for example, the mesh cut generation module 202 of FIG. 2. The mesh cut fusion circuitry 1020 is, for example, the mesh cut fusion module 204 of FIG. 2.

The mesh cut generation circuitry 1018 includes a threshold identification circuitry 1022 and a mesh cut identification circuitry 1024. The threshold identification circuitry 1022 identifies the threshold used by the mesh cut generation circuitry 1018 in generating mesh cuts. The threshold identification circuitry 1022 identifies the threshold in various manners, such as accessing a pre-configured threshold value in the mesh cut generation circuitry 1018, retrieving the threshold from another device, receiving a user input specifying the threshold, and so forth.

The mesh cut identification circuitry 1024 identifies the subtrees of a non-base level of detail bounding volume hierarchy having less than or equal to the threshold number of child nodes. The threshold number of child nodes is identified by the threshold identification circuitry 1022.

The mesh cut fusion circuitry 1020 includes insertion point identification circuitry 1026, surface area refitting circuitry 1028, and subtree selection circuitry 1030. To insert a subtree of the mesh cut into the base bounding volume hierarchy, the insertion point identification circuitry 1026 traverses the base bounding volume hierarchy until a node of the base bounding volume hierarchy is identified that has two child nodes neither of which has a surface area that completely occupies the surface area of the subtree. The insertion point identification circuitry 1026 selects as the insertion point for the subtree one of those two child nodes (e.g., the one of the two child nodes having a surface area that overlaps the surface area of the subtree the most). The insertion point identification circuitry 1026 optionally takes into account various additional factors in determining the insertion points for subtrees, such as limiting the number of subtrees that are inserted at each node as discussed above.

The surface area refitting circuitry 1028 identifies situations in which the surface area of a node at an insertion point does not include all of the surface area of the subtree that was inserted. In such situations, the surface area refitting circuitry 1028 adjusts the surface are of the node to include all of the surface area in the lower nodes of the subtree that was inserted as discussed above.

The subtree selection circuitry 1030 determines the order in which subtrees are selected from a mesh cut. The subtree selection circuitry 1030 determines the order in any of various manners, e.g., by determining an efficiency cost of the root node of each subtree in the mesh cut and selecting the subtrees based on efficiency costs, such as from smallest efficiency cost to largest efficiency cost as discussed above.

The fused bounding volume hierarchy traversal circuitry 1016 includes a fused node identification circuitry 1032 and a geometric object output circuitry 1034.

The fused bounding volume hierarchy traversal circuitry 1016 is, for example, the fused bounding volume hierarchy traversal system 104 of FIG. 1.

The fused node identification circuitry 1032 receives a level of detail (e.g., the level of detail 110 of FIG. 1). When traversing the fused bounding volume hierarchy, at each node the fused node identification circuitry 1032 checks whether there is a fused node corresponding to the received level of detail. If there is a fused node corresponding to the received level of detail, the fused node identification circuitry 1032 proceeds to traverse the subtree that is fused to the node. If there is not a fused node corresponding to the received level of detail, the fused node identification circuitry 1032 continues to traverse the base bounding volume hierarchy portion of the fused founding volume hierarchy rather than a subtree from a mesh cut of a non-base level of detail bounding volume hierarchy.

The geometric object output circuitry 1034 identifies the geometric objects (e.g., triangle primitives) obtained by traversing the fused bounding volume hierarchy based on the received level of detail. The geometric object output circuitry 1034 outputs those geometric objects to the display controller 1012 for display by the device 1000.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    receiving a base bounding volume hierarchy and a first bounding volume hierarchy that is separate from the base bounding volume hierarchy;
    generating a first mesh cut in the first bounding volume hierarchy, wherein the first mesh cut identifies multiple subtrees in the first bounding volume hierarchy; and
    generating a fused bounding volume hierarchy by inserting the first mesh cut into a base bounding volume hierarchy.

2. The method of claim 1, the generating the first mesh cut comprising identifying as the multiple subtrees in the first bounding volume hierarchy subtrees having less than a threshold number of child nodes.

3. The method of claim 2, further comprising receiving a user input specifying the threshold number.

4. The method of claim 1, further comprising:

receiving a second bounding volume hierarchy; and generating a second mesh cut in the second bounding volume hierarchy, wherein the second mesh cut identifies multiple subtrees in the second bounding volume hierarchy, and wherein the generating the fused bounding volume hierarchy further comprises inserting the second mesh cut into the base bounding volume hierarchy.

5. The method of claim 1, the generating the fused bounding volume hierarchy comprising:

determining an efficiency cost for each of the multiple subtrees; and inserting the multiple subtrees into the base bounding volume hierarchy in an order from smallest efficiency cost to largest efficiency cost.

6. The method of claim 1, wherein the fused bounding volume hierarchy comprises multiple fused nodes in a tree structure, and the generating the fused bounding volume hierarchy comprises:

selecting a subtree of the multiple subtrees;

traversing the base bounding volume hierarchy starting with a root node of the base bounding volume hierarchy;

selecting, as an insertion point in the base bounding volume hierarchy for the subtree, a node of the base bounding volume hierarchy having a surface area that does not completely occupy a surface area of the subtree; and inserting the subtree into the base bounding volume hierarchy at the insertion point.

7. The method of claim 1, wherein the fused bounding volume hierarchy comprises multiple fused nodes in a tree structure, and the generating the fused bounding volume hierarchy comprises setting a flag in a last fused node in each possible path through the fused bounding volume hierarchy indicating that the node is a terminal node.

8. The method of claim 1, wherein the fused bounding volume hierarchy comprises multiple nodes in a tree structure, and the generating the fused bounding volume hierarchy comprises setting a flag in each of the multiple nodes that does not have a descendant with a terminal flag and a sibling of the node has a descendant indicating that the node is a terminal node.

9. The method of claim 1, wherein the base bounding volume hierarchy includes a highest level of detail for a scene and the first bounding volume hierarchy includes a lower level of detail for the scene.

10. A device, comprising:

a processor; and a computer-readable storage medium having stored thereon multiple instructions that, responsive to execution by the processor, cause the processor to perform acts including:

receiving a base bounding volume hierarchy and a first bounding volume hierarchy that is separate from the base bounding volume hierarchy;

generating a first mesh cut in the first bounding volume hierarchy, wherein the first mesh cut identifies multiple subtrees in the first bounding volume hierarchy; and generating a fused bounding volume hierarchy by inserting the first mesh cut into a base bounding volume hierarchy.

11. The device of claim 10, the generating the first mesh cut comprising identifying as the multiple subtrees in the first bounding volume hierarchy subtrees having less than a threshold number of child nodes.

12. The device of claim 11, the acts further including receiving a user input specifying the threshold number.

13. The device of claim 10, the acts further including:

receiving a second bounding volume hierarchy; and generating a second mesh cut in the second bounding volume hierarchy, wherein the second mesh cut identifies multiple subtrees in the second bounding volume hierarchy, and wherein the generating the fused bounding volume hierarchy further comprises inserting the second mesh cut into the base bounding volume hierarchy.

14. The device of claim 10, the generating the fused bounding volume hierarchy comprising:

determining an efficiency cost for each of the multiple subtrees; and inserting the multiple subtrees into the base bounding volume hierarchy in an order from smallest efficiency cost to largest efficiency cost.

15. The device of claim 10, wherein the fused bounding volume hierarchy comprises multiple fused nodes in a tree structure, and the generating the fused bounding volume hierarchy comprises setting a flag in a last fused node in each possible path through the fused bounding volume hierarchy indicating that the node is a terminal node.

16. The device of claim 10, wherein the base bounding volume hierarchy includes a highest level of detail for a scene and the first bounding volume hierarchy includes a lower level of detail for the scene.

17. The device of claim 10, wherein the fused bounding volume hierarchy comprises multiple nodes in a tree structure, and the generating the fused bounding volume hierarchy comprises:

selecting a subtree of the multiple subtrees;

traversing the base bounding volume hierarchy starting with a root node of the base bounding volume hierarchy;

selecting, as an insertion point in the base bounding volume hierarchy for the subtree, a node of the base bounding volume hierarchy having a surface area that does not completely occupy a surface area of the subtree; and inserting the subtree into the base bounding volume hierarchy at the insertion point.

18. A system, comprising:

a fused node identification circuitry to receive an indication of a first level of detail for a scene corresponding to a first non-base bounding volume hierarchy; and a geometric object output circuitry to identify geometric objects corresponding to the first level of detail by traversing a fused bounding volume hierarchy that includes a mesh cut that identifies multiple subtrees in the first non-base bounding volume hierarchy that are inserted into a base bounding volume hierarchy and output the geometric objects for the scene to a display controller, wherein the first non-base bounding volume hierarchy is separate from the base bounding volume hierarchy.

19. The system of claim 18, wherein the indication of the level of detail for the scene indicates a lower level of detail than a highest level of detail for the scene, and traversing the fused bounding volume hierarchy includes identifying a node in the fused bounding volume hierarchy where a subtree corresponding to the first level of detail has been inserted, and traversing the subtree.

20. The system of claim 18, wherein:

the fused node identification circuitry is to receive an indication of a second level of detail for a scene corresponding to a second non-base bounding volume hierarchy; and the geometric object output circuitry is to identify geometric objects corresponding to the second level of detail by traversing the fused bounding volume hierarchy that includes a mesh cut that identifies multiple subtrees in the second non-base bounding volume hierarchy that are inserted into the base bounding volume hierarchy.

\* \* \* \* \*